3,702,768
LOW CALORIE FROZEN DESSERTS
Thomas P. Finucane, Hartsdale, and Philip J. Capasso, Ossining, N.Y., assignors to General Foods Corporation, White Plains, N.Y.
No Drawing. Filed Nov. 17, 1969, Ser. No. 877,520
Int. Cl. A23g 5/00
U.S. Cl. 99—136         4 Claims

ABSTRACT OF THE DISCLOSURE

A low calorie frozen dessert having eating qualities approximating that of ice cream is formed from the whipped emulsion of a particular combination of liquid oils and hydrogenated vegetable fats in a matrix phase comprising water, proteins, and sugars. A critical amount of a high capacity water binding material such as gelatin is present in the composition to attain the desired mouth-feel of the product.

BACKGROUND OF THE INVENTION

This invention relates to food products and more particularly to low calorie frozen desserts having a high overrun, an excellent "getaway" in the mouth, and a consistency and taste approaching that of conventional ice cream. As used in this invention and as recognized by those skilled-in-the-art, the term "overrun" refers to the percent increase in volume upon whipping and chilling the wet mix, and the term "getaway" refers to ease of melting in the mouth.

The product of this invention possesses eating qualities and texture closely approximating those of conventional ice cream while it possesses a caloric value per serving substantially less than that of ice cream. The low caloric content of the instant product is due predominately to the ability of the disclosed compositions to attain an overrun substantially greater than that of conventional ice cream, and to a lesser extent to the high water content of the compositions.

In addition the product of this invention, unlike conventional ice cream is readily scoopable at 0° F. and does not melt and run when allowed to sit for a brief period at room temperature.

Many attempts have been made prior to this invention to produce a low calorie frozen dessert which simulates ice cream, but these products have not proven to be acceptable to the consumer in terms of taste and mouth-feel. For the most part these prior art products have been unable to duplicate the cooling sensation in the mouth that makes ice cream such a refreshing and enjoyable food product. This invention yields a product which closely approximates the body, taste and mouth-feel of ice cream. Additionally the products of this invention, due to the absence of butter fat, possess an increased storage stability over conventional ice cream.

SUMMARY OF THE INVENTION

In accordance with the present invention a low calorie frozen dessert is produced by the use of a combination of liquid vegetable oil and hydrogenated vegetable fat emulsified in a matrix phase comprising water, protein and sugar. Additionally the product contains a critical amount of a high capacity water binding material as well as effective amounts of emulsifying and flavoring agents. The compositions of this invention are able to function as low calorie desserts primarily due to the ability of the composition to achieve an overrun about twice as large as can be obtained with conventional ice cream. As will be appreciated by those skilled-in-the-art, each ingredient of the comosition not only has its separate function, but also affects the overall combination to produce a product which would not be foreseen merely from the properties of the individual ingredients.

It is an object of this invention to produce a low-calorie frozen dessert which has the texture and taste of conventional ice cream.

It is another object of this invention to produce a frozen dessert which will not readily soften and run at room temperature.

Yet another object of this invention is to produce a low calorie frozen dessert which possesses the mouth-feel and cooling sensation of ice cream.

These and other objects of this invention will be obvious from the description herein.

DETAILED DESCRIPTION OF THE INVENTION

In general, the present invention comprises an edible composition, including a liquid vegetable oil-vegetable fat mixture emulsified in a water-protein-sugar solution, which composition is whipped to a high overrun (at least 200) and frozen to produce a low calorie dessert. The composition also includes as an essential ingredient a critical amount of a high capacity water binding material. The frozen dessert product of this invention comprises a composition on a percent weight basis of:

|  | Percent |
|---|---|
| Protein solids | 2–7 |
| Water binding material | 0.7–2 |
| Sugar | 10–15 |
| Water | 60–70 |
| Hydrogenated vegetable fat | 10–15 |
| Liquid vegetable oil | 2–5 |
| Emulsifier | 2–6 |
| Color-flavor agents | .05–0.5 |

The protein solids used in the compositions of this invention include any of the whippable proteins such as sodium caseinate, casein, lactalbumin, whey solids, soy protein, hydrolyzed soy protein and other hydrolyzed cereal proteins. These whippable protein materials are capable of being aerated to produce a high overrun.

The high capacity water binding material, such as a gelatin of high bloom, is capable of binding water in the frozen dessert composition in such a manner that the consumer will be unable to detect, by taste, the large percentage of water present in the frozen dessert. Although this invention is phrased in terms of having gelatin, a protein material, as the water binding material, it is to be understood that this is only the preferred material and that other materials (e.g. starch and other macromolecules in the carbohydrate class) having high water binding capacity may be used in an equivalent manner. The gelatin can be used in amounts of from 0.7% to 2% by weight of the composition; however, percentages of from 0.9% to 1.5% are preferred. Generally speaking, the higher the bloom of the gelatin the less is the amount required; however one skilled-in-the-art will readily be able to determine the optimum conditions. Care must be taken to avoid the incorporation of too much gelatin since the texture of the final product will be adversely affected. This results from the fact that virtually all the water will be bound with the gelatin and there will be insufficient free water remaining. This free water is a necessary component of the final composition since it is only this water which will produce the desired melting sensation in the mouth of the consumer when the frozen composition is eaten.

The preferred sugar for use in the composition of this invention is sucrose; however, other sweetening agents such as corn syrup solids, dextrose, fructose, and the like or mixtures of any of these can also be used.

It has been found that the ice cream like taste and consistency sought by the compositions of this invention can be produced by a particular combination of about 3 to 5 parts by weight of fat consisting of hydrogenated vegetable fats and 1 part by weight of liquid vegetable oil. The fats which can be used in this invention are those which melt easily in the mouth and which soften and melt in the neighborhood of 25° F. The vegetable oils used both in the production of the fat component and as the liquid oil component can include cottonseed oil, soybean oil, corn oil, palm oil, coconut oil, peanut oil and the like. The preferred fats are the hydrogenated mixtures of coconut and palm oils available commercially under the name Wecotop A. The preferred liquid oil is cottonseed oil.

The emulsifiers of the present invention can be any of those commonly used in the food industry or mixtures of any of these such as egg yolk, various monoglycerides such as glycerol monostearate, etc., and other natural or synthetic products which are capable of forming stable oil-in-water emulsions. Particularly good results in obtaining a high overrun have been obtained by using as the emulsifier a principal amount (85% to 95%) of propylene glycol monostearate together with a lesser amount (5% to 15%) of lecithin. It is believed, although it is not wished to be limited to such, that the lecithin acts to modify and extend the whippable protein in such a manner that the protein is capable of whipping to an increased overrun.

The flavoring and coloring agents may include ingredients accepted for use in foods by the regulating agencies of the Federal Government.

The formulations of this invention are able to be whipped to an overrun in excess of 200. This high value is not able to be attained with conventional ice cream which normally has an overrun in the range of from 80 to 100. The ability to attain the high overrun is thought to be due to the presence and amount of the high capacity water binding material in the formulations of this invention. While it is recognized that conventional ice cream may contain some gelatin-like material, the gelatin is present to help stabilize the butter fat emulsion and to regulate the size of ice crystals in the ice cream to a small size and is present in amounts of only about 0.3% by weight.

The high overrun enables the products of this invention to function as low calorie frozen desserts. It is estimated that about a 45% reduction in calories is able to be achieved by the instant product as compared with conventional ice cream.

The process for preparing the frozen desserts of this invention involves heating the water component to boiling and then dissolving and mixing the gelatin in the hot water. The whippable protein and sugar components should be preblended in dry form prior to their addition to the water so that, upon blending, a thoroughly homogeneous foamed mixture is produced. The selected fats, oils and emulsifiers should be intimately combined before forming the final emulsion. This is preferably accomplished by melting the fats together with the oil and emulsifiers, pouring the liquid fat-oil-emulsifier mixture into the foamed and heated protein-sugar-water mixture and homogenizing the combined mixture to form an emulsion. This emulsion is then chilled and whipped at a high speed until stiff peaks form. The mixture is finally frozen at about −35° F. and then stored at 25° F.

The color-flavor agents may be added at virtually any point in the mixing process; however, preferably they are added to the protein-sugar-water mixture just prior to the blending step.

It is also contemplated by this invention that the formulations disclosed herein, prior to whipping and freezing, could be reduced to a dry mix, which, when reconstituted with water and whipped, could be frozen into a dessert similar to that described above. The dry mix product of this invention comprises a composition on a weight basis of:

| | Percent |
|---|---|
| Protein solids | 6–20 |
| Gelatin | 2–6 |
| Sugar | 30–45 |
| Hydrogenated vegetable fat | 30–45 |
| Liquid vegetable oil | 6–15 |
| Emulsifier | 6–18 |
| Color-flavor agents | 0.2–1.5 |

DESCRIPTION OF THE PREFERRED EMBODIMENT

The invention is further demonstrated by the following example:

| | Grams | Weight percent |
|---|---|---|
| Gelatin (235 Bloom) | 4.00 | 0.95 |
| Sodium caseinate | 10.00 | 2.38 |
| Sugar (sucrose) | 51.00 | 12.11 |
| Water | 275.00 | 65.35 |
| Hydrogenated vegetable fat (Wecotop A) | 56.00 | 13.31 |
| Propylene gylcol monostearate | 13.00 | 3.09 |
| Lecithin | 1.30 | 0.31 |
| Liquid vegetable oil (cottonseed) | 10.00 | 2.38 |
| Color-flavor agents | 0.52 | 0.12 |

The water is heated to boiling and the gelatin is dissolved therein. A preblended mixture of the sodium caseinate and sugar is added to the water gelatin solution and the mixture together with the color-flavor agents, is blended in a Waring Blendor, for about 2 minutes, in order to produce a foamed blend. The hydrogenated vegetable fat is melted in a double boiler, and mixed with the liquid vegetable oil and emulsifiers. This mixture is then poured into the (still warm) foamed protein-sugar-water mixture and homogenized by two passes through a Manton Gaulin Homogenizer at 3000 p.s.i.g. The resulting emulsion is poured into a bowl and chilled in an ice bath to 59° F. The chilled emulsion is whipped at a high speed until stiff peaks form, frozen at −35° F., and finally stored at 25° F. The frozen whipped emulsion of this example whips to an overrun of 217 and possesses a caloric content, based on a standard ⅙ quart serving, of 111. An equal amount of a commercial medium fat content ice cream possesses a calorie count of 197.[1] The product of the example has the physical appearance of ice cream and the product possesses a taste and mouth-feel closely resembling that of conventional ice cream.

The frozen products of this invention are notable in that they are able to impart to the consumer a sensation of coldness similar to the mouth-feel of ice cream. Additionally these products are exceptionally convenient as frozen desserts, since they are quite easily scooped and served right out of the freezer and since the dessert will retain its body and not melt and turn soupy as readily as conventional ice cream.

Although the product of this invention has been described as a low-calorie frozen dessert, it will be apparent to those skilled-in-the-art that this product may form the basis of other type desserts such as whipped cream-like products, Bavarian cream-like products and other frozen desserts based on fat emulsions.

---
[1] Food Values of Portions Commonly Used, Bowes & Church, p. 22.

Having thus described the invention what is claimed is:

1. A low calorie, frozen ice cream-type dessert composition having a high overrun in excess of 200% comprising on a weight basis:

| | Percent |
|---|---|
| Whippable protein solids | 2–7 |
| Gelatin | 0.7–2 |
| Sugar | 10–15 |
| Water | 60–70 |
| Hydrogenated vegetable fat | 10–15 |
| Liquid vegetable oil | 2–5 |
| Emulsifier | 2–6 |

2. The composition of claim 1 wherein gelatin is present at from 0.9% to 1.5% of the composition.

3. The composition of claim 2 wherein the whippable protein is sodium caseinate.

4. The composition of claim 3 wherein the emulsifier comprises a principal amount of propylene glycol monostearate and a lesser amount of lecithin.

References Cited
UNITED STATES PATENTS

| | | | |
|---|---|---|---|
| 3,355,300 | 11/1967 | Avedikian et al. | 99—136 |
| 3,431,117 | 3/1969 | Lorant | 99—136 |
| 2,679,458 | 5/1954 | Katz | 99—136 |
| 3,188,098 | 5/1965 | Baur | 99—139 X |

RAYMOND N. JONES, Primary Examiner

J. M. HUNTER, Assistant Examiner